(No Model.)
H. A. MUELLER.
CARPET SWEEPER.
No. 259,901. Patented June 20, 1882.
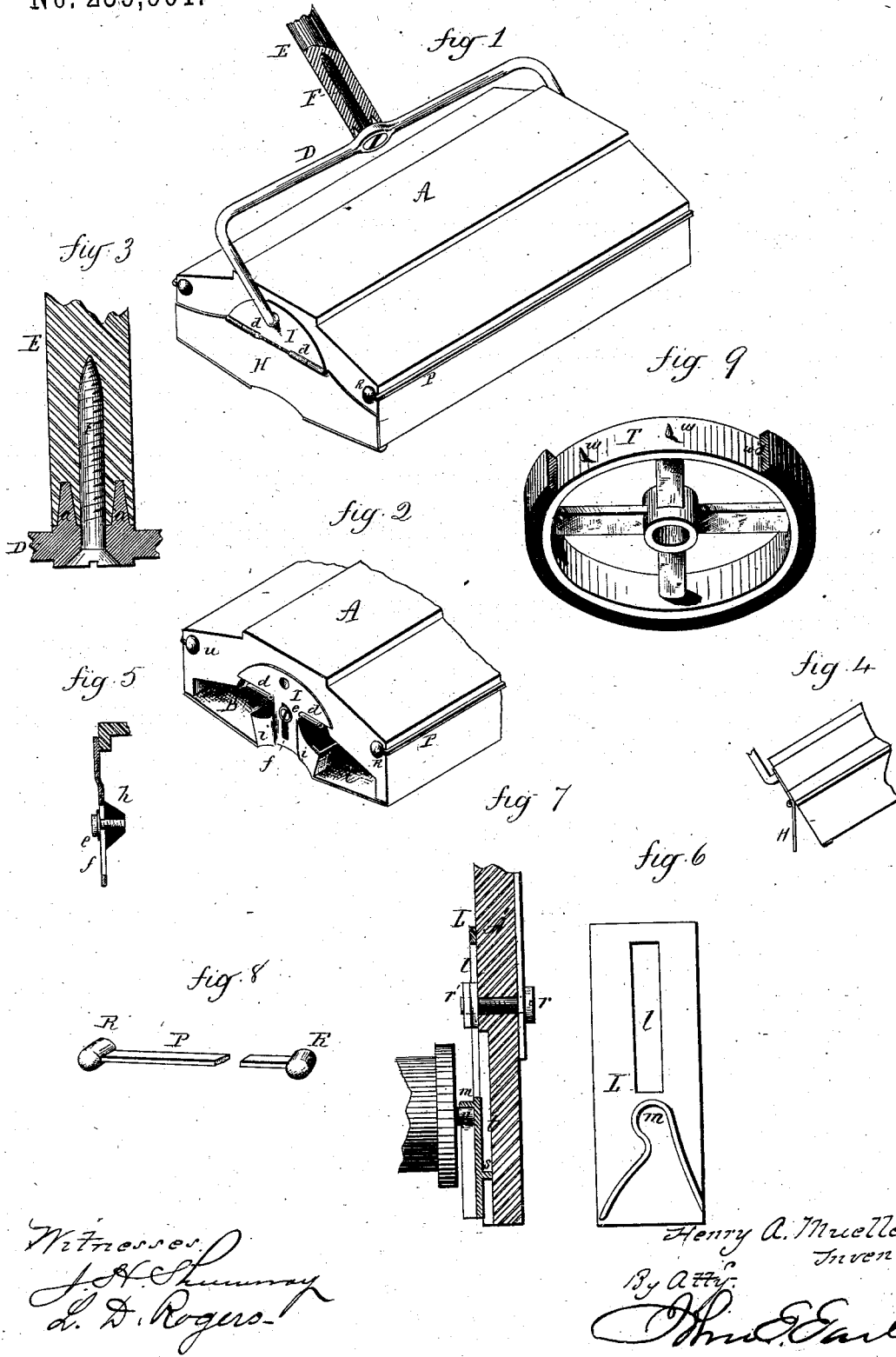
Henry A. Mueller
Inventor

UNITED STATES PATENT OFFICE.

HENRY A. MUELLER, OF NEW HAVEN, CONNECTICUT, ASSIGNOR TO MARIA WIEDERSUM, OF NEW YORK, N. Y.

CARPET-SWEEPER.

SPECIFICATION forming part of Letters Patent No. 259,901, dated June 20, 1882.

Application filed June 6, 1881. Renewed April 21, 1882. (No model.)

*To all whom it may concern:*

Be it known that I, HENRY A. MUELLER, of New Haven, in the county of New Haven and State of Connecticut, have invented a new Improvement in Carpet-Sweepers; and I do hereby declare the following, when taken in connection with the accompanying drawings and the letters of reference marked thereon, to be a full, clear, and exact description of the same, and which said drawings constitute part of this specification, and represent, in—

Figure 1, a perspective view; Figs. 2 to 9, inclusive, detached views.

This invention relates to an improvement in carpet-sweepers; and the invention consists in the construction, as hereinafter described, and particularly recited in the claims.

A represents the box, of the usual form, within which the brush is longitudinally and centrally arranged, with a dirt-receiver, B, at one side, and C at the opposite side.

D is the bail to which the handle E is applied.

Instead of the usual socket on the bail to receive the handle, and in which it is difficult to retain the handle tight and firm, I construct the bail with a perforation through the center to receive a common wood-screw, F, as seen in Fig. 3, and on the upper side of the bail, and near the perforation, I construct one or more spurs, $a$, to enter the end of the handle E to prevent it from turning. The handle is set in its proper position onto the spurs, and the screw F inserted through the bail into the handle secures it to the bail in the most perfect manner.

As a means for dumping the dirt from the receivers, I construct the box with an opening into each receiver at one end, as seen in Fig. 2. Then to that end I hinge a metal flap, H, as seen in Fig. 1. Its own gravity holds it in a closed position; but when the sweeper is tipped, as in Fig. 4, the flap H retains its perpendicular position, and therefore swings away from the opening to permit the dirt to escape. The floor of the dirt-receivers extends outward, so that the flap closes onto the floor, and so that the projecting part of the floor forms a guard to prevent accidental opening of the flap.

As a means for supporting the brush and the floor of the dirt-receivers, as also the fixed part of the hinge for the flap, I construct a plate, I, fixed to the end of the box, and constructed with parts $d$ of the knuckle for the hinge of the flap, and with a central downward projection, $e$, in which is a vertical slot, $f$, through which a bearing, $h$, for the brush is secured, as seen in Fig. 5, so as to be adjustable vertically to raise or lower that end of the brush. From the projection $e$ an arm, $i$, extends— one to the right and the other to the left— to which the inner side of the dirt-receiver is attached, as seen in Fig. 2. The flap H is hung to the knuckles $d\ d$ by a pintle, in the usual manner for making a hinge. To support the opposite end of the brush and make it adjustable I construct a plate, L, as seen in Fig. 6, which shows an inside view of the plate. Through this is a longitudinal slot, $l$, and on the inside a slot, $m$, for the pivot $n$ of the brush. (See also Fig. 7.) This seat is made by a flange on the surface extending from the seat proper toward the bottom, gradually expanding, as seen in Fig. 6, the expanding mouth serving to guide the pivot to the seat.

Through the end A' of the box a bolt, $r$, is introduced through the slot $l$ in the plate L, as seen in Fig. 7, a nut, $r'$, upon the inside serving to bind the plate upon the inside of the box, the slot permitting the adjustment of the plate vertically, which raises or lowers the brush.

In order that a single bolt may serve the purpose to hold the plate L, a stud, $s$, is made on the back of the plate to set into a vertical groove, $t$, in the end A' of the box. The stud $s$ moving up and down with the plate, and fitting the groove, prevents the plate from turning, so that the single bolt is all that is required.

P is an india-rubber guard arranged in a groove on the side of the box. This guard is constructed, as seen in perspective, Fig. 8, from a straight narrow strip, P, a little longer than the box, and with a boss, R, at each end. The box is constructed with a longitudinal groove on each side to receive the strip P, and with a recess, $u$, at each end, into which the bosses R may be pressed. These bosses project in the form of cushions, and when turned around onto the end of the box and set into their seats they serve to retain the strip or guard P in its groove, because they are larger than the thickness of the groove, and the strain upon them made by the strip is at right angles to their seat, so that it does not tend to draw them therefrom. The strip is stretched so as to strain it longitudinally.

The wheels of this class of sweepers are usually provided with a soft-rubber tire. Various devices have been employed to hold the tires in place, as with gum, or by making a groove in the face of the wheel; but in either case they are frequently run off the wheel. To prevent the detachment of the rubber tire I construct the wheel T with radially-projecting spurs $w$ on its surface, more or less in number, then stretch the rubber tire X over the spurs, and so that the spurs enter the rubber and hold it in position.

I do not wish to be understood as broadly claiming a carpet-sweeper with a flap arranged to open the end of both the dirt-receivers, as such, I am aware, is not new; but I am not aware that a flap has been arranged to retain its closed position, or to open simply by its own gravity, and without fastening devices to hold it in its closed position.

I am also aware that india-rubber guards have been introduced in grooves in the side of a sweeper, and therefore do not broadly claim such construction; but What I do claim is—

1. In a carpet-sweeper constructed with dirt-receivers and open at one end, the plate I, secured to the box at the said end, constructed with a vertical slot, $f$, for the adjustment of the brush, and with arms $i$ to support the dirt-receivers, combined with the flap H, hinged to the said plate, substantially as described.

2. In a carpet-sweeper, the vertically-slotted plate L, constructed with the seat $m$ for the brush-pivot, and with a stud, $s$, on its opposite side, combined with a bolt, $r$, through the end A' of the box, and the slot in the plate, the said end A' of the box constructed with a vertical groove, $t$, on its inside to receive the stud $s$, substantially as described.

3. In a carpet-sweeper, an india-rubber guard consisting of a straight narrow strip, P, with a boss, R, at each end, the said strip introduced into a longitudinal groove on the side of the box, the said bosses turned onto the ends and inserted in corresponding recesses thereon, substantially as described.

HENRY A. MUELLER.

Witnesses:
JOHN E. EARLE,
L. D. ROGERS.